United States Patent
Cramm et al.

(10) Patent No.: US 10,731,458 B2
(45) Date of Patent: Aug. 4, 2020

(54) PASSIVE RANGING TO A TARGET WELL USING A FIBER OPTIC RANGING ASSEMBLY

(71) Applicant: HALLIBURTON ENERGY SERVICES, INC., Houston, TX (US)

(72) Inventors: Carl J. Cramm, Houston, TX (US); Andrew John Cuthbert, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 151 days.

(21) Appl. No.: 15/759,797

(22) PCT Filed: Oct. 20, 2015

(86) PCT No.: PCT/US2015/056484
§ 371 (c)(1),
(2) Date: Mar. 13, 2018

(87) PCT Pub. No.: WO2017/069745
PCT Pub. Date: Apr. 27, 2017

(65) Prior Publication Data
US 2018/0252093 A1   Sep. 6, 2018

(51) Int. Cl.
*E21B 47/13* (2012.01)
*E21B 7/04* (2006.01)
(Continued)

(52) U.S. Cl.
CPC ............. *E21B 47/107* (2020.05); *E21B 7/04* (2013.01); *E21B 47/024* (2013.01);
(Continued)

(58) Field of Classification Search
CPC .......... E21B 7/04; E21B 47/024; E21B 47/12; E21B 47/122; E21B 47/13
See application file for complete search history.

(56) References Cited

U.S. PATENT DOCUMENTS 6,269,198 B1 * 7/2001 Hodgson ............... G01H 9/004
356/478
6,937,023 B2   8/2005 McElhinney
(Continued)

FOREIGN PATENT DOCUMENTS

EP       0905315 A2    3/1999
GB       2254430 A    10/1992
(Continued)

OTHER PUBLICATIONS

Extended European Search Report issued for European Patent Application No. 15906828.7 dated Sep. 9, 2018, 8 pages.
(Continued)

*Primary Examiner* — Catherine Loikith
(74) *Attorney, Agent, or Firm* — Haynes and Boone, LLP (57) ABSTRACT

A well system includes a target wellbore that penetrates a subterranean formation and a relief wellbore drilled toward the target wellbore and a target intercept location where a fluid flows into the target wellbore from the subterranean formation. A bottom hole assembly is coupled to a drill string extended into the relief wellbore and includes a fiber optic ranging assembly having one or more fiber optic sensors positioned on a tubular member. The fiber optic sensors measure at least one of acoustic energy and thermal energy emitted by the fluid as it flows into the target wellbore. A computer system is communicably coupled to the one or more fiber optic sensors to process measurements of the fluid obtained by the one or more fiber optic sensors.

38 Claims, 4 Drawing Sheets

(51) Int. Cl.
*E21B 47/024* (2006.01)
*E21B 47/12* (2012.01)
*E21B 47/107* (2012.01)
*E21B 47/07* (2012.01)
*E21B 47/103* (2012.01)
*E21B 47/113* (2012.01)
*E21B 47/135* (2012.01)
*E21B 47/0224* (2012.01)
*G01V 1/00* (2006.01)
*G01V 9/00* (2006.01)

(52) U.S. Cl.
CPC .......... *E21B 47/0224* (2020.05); *E21B 47/07* (2020.05); *E21B 47/103* (2020.05); *E21B 47/113* (2020.05); *E21B 47/135* (2020.05); *G01V 1/001* (2013.01); *G01V 9/005* (2013.01)

(56) References Cited

U.S. PATENT DOCUMENTS

| | | |
|---|---|---|
| 6,997,256 B2 * | 2/2006 | Williams ............. E21B 47/065 166/250.01 |
| 7,954,560 B2 | 6/2011 | Mathiszik et al. |
| 8,294,468 B2 | 10/2012 | Reiderman |
| 2001/0020675 A1 | 9/2001 | Tubel et al. |
| 2002/0007945 A1 | 1/2002 | Neuroth et al. |
| 2009/0120691 A1 | 5/2009 | Waters et al. |
| 2009/0178850 A1 | 7/2009 | Waters et al. |
| 2012/0096935 A1 | 4/2012 | Finke et al. |
| 2013/0118809 A1 * | 5/2013 | Veeningen ............. E21B 47/02 175/45 |
| 2014/0121971 A1 | 5/2014 | Hanak et al. |
| 2016/0259079 A1 * | 9/2016 | Wilson .................... G01V 1/42 |

FOREIGN PATENT DOCUMENTS

| | | |
|---|---|---|
| WO | WO 2011/047261 A2 | 4/2011 |
| WO | WO 2015/094180 A1 | 6/2015 |
| WO | WO-2015/094202 A1 | 6/2015 |

OTHER PUBLICATIONS

Flores et al., "Relief Well Planning," IADC/SPE 168029, 2014, 10 pages.

International Search Report and Written Opinion from PCT/US2015/056484, dated Jul. 20, 2016, 16 pages.

\* cited by examiner

PASSIVE RANGING TO A TARGET WELL USING A FIBER OPTIC RANGING ASSEMBLY

BACKGROUND

In the field of well construction in the oil and gas industry, it is sometimes necessary to drill a second well to provide a conduit for establishing hydraulic communication with a first well. This may be necessary, for example, when it is required to kill or intervene with the first well, especially in scenarios where surface intervention on the first well is impossible or impractical. Accordingly, the second well is commonly referred to as a "relief well," while the first well is referred to as a "target well."

The relief well is typically drilled from the Earth's surface as a straight borehole down to a planned kick-off point, where it is deviated toward the target well using conventional directional drilling technology. Drilling then is continued until the relief well intercepts the target well, usually at a shallow angle, and thereby establishes hydraulic communication between the two wells. High-density fluids can then be pumped into the target well from the relief well to generate hydrostatic pressure within the target well that stops well fluids from advancing to the surface. This process is commonly referred to as "killing" the target well.

In order to accurately intercept the target well, wellbore ranging techniques are employed. Traditional wellbore ranging techniques and/or technologies concentrate on the ability to detect a remnant ferromagnetic field from the target well or an induced magnetic field by some means from either the relief well or the target well. This requires some sort of metal casing or piping to be positioned within the target well to help facilitate the magnetic field. These wellbore ranging techniques, however, do not work in open-hole wellbores having no metal casing or piping positioned therein.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to well intercept and kill operations in the oil and gas industry and, more particularly, to controlling wellbore trajectory for the intersection and hydraulic communication of a first well by a second well using fiber optic ranging.

The embodiments provided herein describe the drilling of a relief well to intersect a target well by detecting acoustic or thermal energy emanating from the target well. The acoustic or thermal energy originates from fluid influx into the target well from a surrounding subterranean formation and may be detected using a fiber optic sensing assembly included in a bottom hole assembly. The relief wellbore is drilled toward the target wellbore and, more specifically, to a target intercept location where the fluid flows into the target wellbore from the subterranean formation. The fiber optic ranging assembly includes one or more fiber optic sensors that measures acoustic energy and/or thermal energy emitted by the fluid as it flows from the formation into the target wellbore. A computer system communicably coupled to the fiber optic sensors processes the acoustic and/or thermal measurements of the fluid obtained by the fiber optic sensors and thereby enables the relief well to zero-in on the target intercept location. The techniques described herein do not require a ferromagnetic source to range to, but rather methods of passive ranging in an open hole are disclosed.

Figure 1:
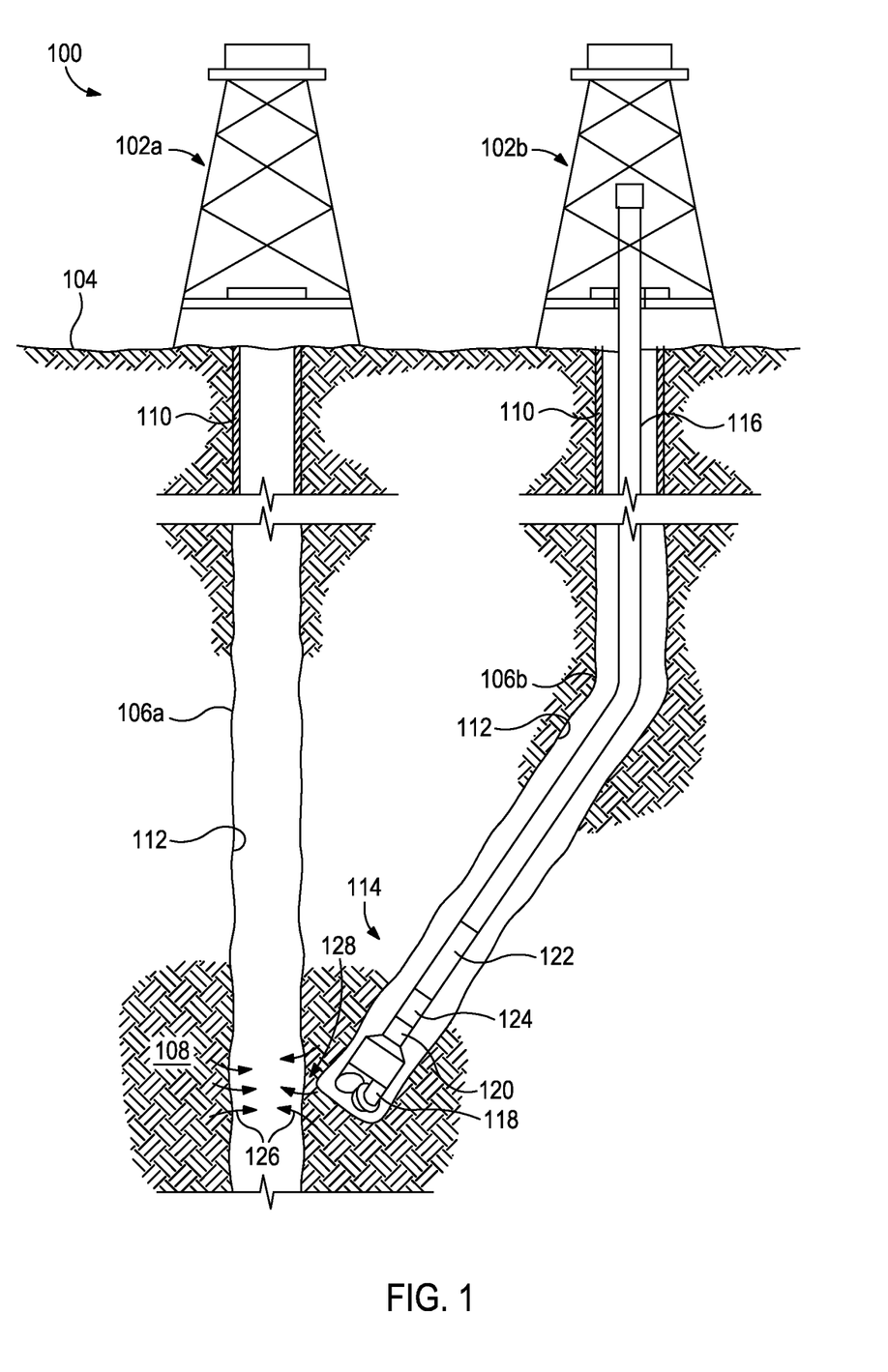
FIG. 1 illustrates an exemplary subterranean well system that may employ the principles of the present disclosure.

FIG. 1 illustrates an exemplary subterranean well system 100 that may employ the principles of the present disclosure. As illustrated, the well system 100 may include a first rig 102a and a second rig 102b both arranged at the Earth's surface 104. The first and second rigs 102a,b may be any one of a drilling rig, a completion rig, a workover rig, or the like. While the first and second rigs 102a,b are depicted as being used in land-based operations, it will be appreciated that the principles of the present disclosure could equally be applied in a sea-based or sub-sea application where one or both of the first and second rigs 102a,b may comprise a floating platform, a semi-submersible platform, or a jack-up rig, as generally known in the art. It will be understood that the present disclosure is not limited by the wellbore geometry depicted in FIG. 1.

A first or "target" wellbore 106a has been drilled and extends from the first rig 102a to penetrate a subterranean formation 108. The target wellbore 106a may be drilled using any suitable or conventional drilling techniques and may extend in a substantially vertical direction away from the Earth's surface 104. While not illustrated, portions of the target wellbore 106a may be deviated, slanted, or horizontal, without departing from the scope of the disclosure. In some embodiments, at least a portion of the target wellbore 106a may be completed by cementing a string of casing 110 therein. The remaining portions of the target wellbore 106a may comprise open-hole 112. In other embodiments, however, the casing 110 may be omitted from the target wellbore 106a and the entire target wellbore 106a may comprise the open-hole 112.

A second or "relief" wellbore 106b may be drilled from the second rig 102b to locate and intercept the target wellbore 106a. The relief wellbore 106b may be drilled to intercept the target wellbore 106a for a variety of reasons, such as to kill the target wellbore 106a or intervene therein where surface intervention into the target wellbore 106a is impossible or impractical. Similar to the target wellbore 106a, in at least one embodiment, a portion of the relief wellbore 106b may be lined with casing 110 while the remaining portions of the relief wellbore 106b may comprise open-hole 112. In other embodiments, however, the casing 110 may be entirely omitted from the relief wellbore 106b.

To drill the relief wellbore 106b, a bottom hole assembly (BHA) 114 may be arranged at the bottom of a drill string 116 extended downhole from the second rig 102b. The second rig 102b may include conventional equipment used to raise and lower the drill string 116 into the relief wellbore 106b and thereby help extend the length of the relief wellbore 106b during drilling operations. The BHA 114 may include a drill bit 118 operatively coupled at the end of the drill string 116. The drill bit 118 is driven either by a downhole motor 120 ("mud motor") or via rotation of the drill string 116 from the second rig 102b. As the drill bit 118 rotates, it creates and extends the length of the relief wellbore 106b.

The BHA 114 provides directional control of the drill bit 118 as it advances the relief wellbore 106b. For example, the BHA 114 may include various sensors and measurement tools, such as a measurement-while-drilling (MWD) tool 122, which may provide real-time measurements of inclination, azimuth, and tool face direction as the drill bit 118 advances the relief wellbore 106b. Based on measurements obtained by the MWD tool 122, the BHA 114 may redirect the trajectory of the drill bit 118 using conventional directional drilling equipment.

The BHA 114 may further include a fiber optic ranging assembly 124 used to help guide the drill bit 118 toward the target wellbore 106a. According to embodiments of the present disclosure, the fiber optic ranging assembly 124 may be configured to detect acoustic and/or thermal energy emitted from the target wellbore 106a and, more particularly, resulting from the influx of a fluid 126 into the target wellbore 106a from the surrounding subterranean formation 108. The fluid 126 flowing into the target wellbore 106a may comprise a variety of liquid or gaseous fluids including, but not limited to, liquid hydrocarbons, gaseous hydrocarbons (e.g., $C_1$ through $C_{10}$), water, carbon dioxide, hydrogen sulfide, and any combination thereof.

As the fluid 126 escapes the formation 108 into the target wellbore 106a, acoustic (seismic and microseismic) and thermal energy is generated by the fluid 126 via interaction with the immediate formations 108 and may be detected by the fiber optic ranging assembly 124. Acoustic and/or thermal energy measurements obtained by the fiber optic ranging assembly 124 may be processed to determine the proximity of the fluid 126 influx into the target wellbore 106a with respect to the real-time position of the BHA 114, and thereby determine a target intercept location 128. By triangulating multiple measurements obtained by the fiber optic ranging assembly 124 as the BHA 114 advances the relief wellbore 106b, the trajectory of the drill bit 118 may be redirected to zero-in on the target intercept location 128 using conventional directional drilling techniques. As the drill bit 118 advances closer to the target intercept location 128, the measurements obtained by the fiber optic ranging assembly 124 will be processed with increased accuracy until close proximity or interception between the relief wellbore 106b and the target wellbore 106a is established. Once the relief wellbore 106b intercepts the target wellbore 106a, hydraulic communication between the two wells is then established and the relief wellbore 106b can be used to kill the target wellbore 106a.

According to embodiments of the present disclosure, the fiber optic assembly 124 may include one or more fiber optic sensors (not shown) that incorporate one or more optical fibers used to detect acoustic and/or thermal energy emitted from the action of the fluid 126 as it flows into the target wellbore 106a. A number of optical fiber sensing methodologies may be used to accomplish this. When electromagnetic radiation (light) is transmitted through an optical fiber, a portion of the electromagnetic radiation will be backscattered by interactions with the surfaces of the optical fiber caused by subjecting the optical fiber to acoustic (seismic and microseismic) or thermal energy fluctuations.

Fiber optic sensing of acoustic energy is typically based on coherent Rayleigh scattering where short pulses of light are launched into the optical fiber and a fraction of the backward scattered light that falls within an angular acceptance cone of the optical fiber in the return direction (i.e., towards the source of the electromagnetic radiation source) is guided back to the launching end of the fiber as a backscattered signal. The backscattered signal results from acoustic (seismic or microseismic) energy acting on the optical fiber, which provides information regarding the time varying state of strain along the optical fiber. The measured strain may be equated to a general direction of where the acoustic energy originates relative to the real-time position of the BHA 114. A detector, such as an optoelectronic device, may be in optical communication with the optical fiber and used to convert the backscattered electromagnetic signals to electrical signals, and a signal processor may process the electrical signals to determine the magnitude of the strain assumed by the optical fiber downstream of the detector.

Fiber optic sensing of thermal energy is typically based on distributed Raman scattering to detect changes in temperature along affected portions of the optical fiber. More specifically, fluctuations or changes in temperature affect the glass fibers of the optical fiber and locally change the characteristics of light propagation in the optical fiber. As a result of a temperature-dependent nonlinear process of Raman scattering, the location and magnitude of a temperature change can be determined so that the optical fiber can essentially be used as a linear thermometer. The backscattered signal resulting from the thermal energy acting on the optical fiber may be equated to a general direction of where the thermal energy originates relative to the real-time position of the BHA 114.

Two additional principles of measurement for fiber optic sensing technology are Optical Time Domain Reflectometry (OTDR) and Optical Frequency Domain Reflectometry (OFDR). OTDR detects and analyzes incoherent Rayleigh backscattering signals generated from narrow laser (light) pulses generated by a laser and sent into the optical fiber. Based on the time it takes the backscattered light to return to the detector, it is possible to locate a change in the characteristics of the optical fiber, which can be equated to a general direction of where the acoustic or thermal fluctuations are originating relative to the BHA 114. OFDR provides information on the local characteristic only when the backscatter signal detected during the entire measurement time is measured as a function of frequency in a complex fashion, and then subjected to Fourier transformation. The essential principles of OFDR technology are the quasi continuous wave mode employed by the electromagnetic radiation source and the narrow-band detection of the optical backscatter signal.

Since the speed of light is, at first approximation, constant along optical fibers, the location in the optical fibers where the backscatter originated can also be readily determined when the effective refractive index of the combined fiber core and cladding is known (e.g., about 1.468 at 1550 nm). Accordingly, the backscattered electromagnetic radiation measured by a detector associated with the fiber optic ranging assembly 124 may be correlated to strain and/or temperature profiles sensed by each fiber optic sensor, which may be equated to a general direction of where the acoustic or thermal fluctuations are originating relative to the BHA 114. Continued measurements of the acoustic or thermal energy may help the BHA 114 guide the drill bit 118 toward the target intercept location 128 using conventional directional drilling techniques until the relief wellbore 106b locates and penetrates the target wellbore 106a.

Figure 2:
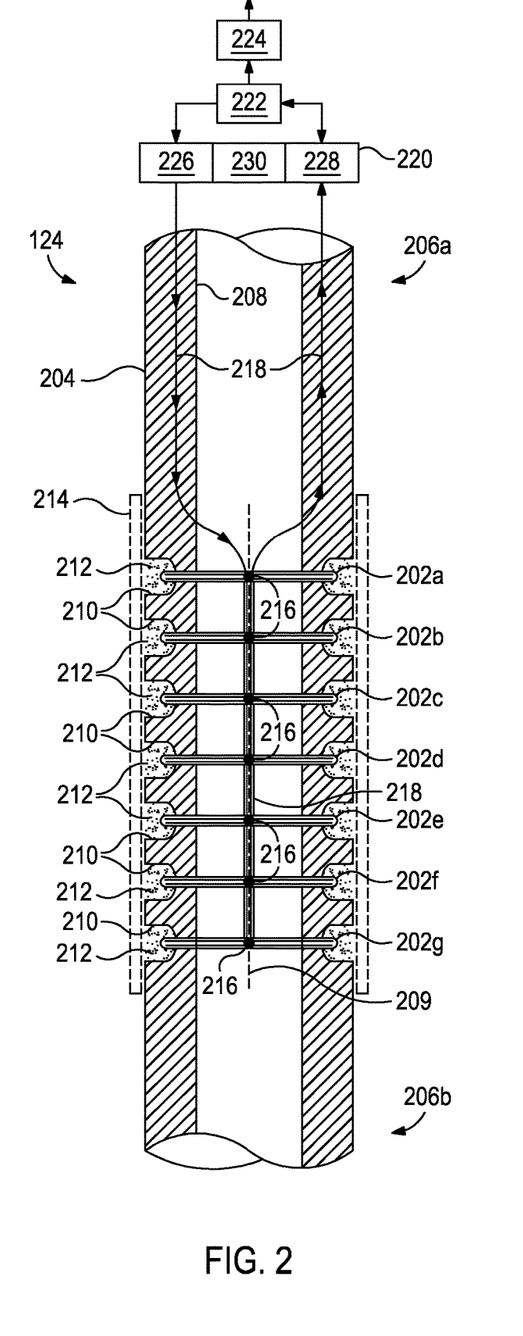
FIG. 2 is a partial cross-sectional side view of an exemplary embodiment of the fiber optic ranging assembly of FIG. 1.

FIG. 2 is a partial cross-sectional side view of an exemplary embodiment of the fiber optic ranging assembly 124, according to one or more embodiments. As illustrated, the fiber optic ranging assembly 124 (hereafter "the assembly 124") may include one or more fiber optic sensors 202 disposed about a tubular member 204. The tubular member 204 may be, for example, a drill collar or a length of drill pipe and may include a first or uphole end 206a and a second or downhole end 206b. The tubular member 204 may be operatively coupled (either directly or indirectly) to the drill string 116 (FIG. 1) at the uphole end 206a. A central flow path 208 is defined through the tubular member 204 between the uphole and downhole ends 206a,b for conveying a drilling fluid (mud) to the drill bit 118 (FIG. 1) arranged downhole from the downhole end 206b.

In the illustrated embodiment, the assembly 124 includes a plurality of fiber optic sensors 202, shown as fiber optic sensors 202a, 202b, 202c, 202d, 202e, 202f, and 202g. The fiber optic sensors 202a-g are axially spaced from each other along the length of the tubular member 204. In some embodiments, the axial spacing of the fiber optic sensors 202a-g may be equidistant between axially adjacent sensors. In other embodiments, the axial spacing of the fiber optic sensors 202a-g may be random between axially adjacent sensors. In yet other embodiments, some fiber optic sensors 202a-g may be equidistantly spaced while others may be randomly spaced along the length of the tubular member 204, without departing from the scope of the disclosure. It will be appreciated, however, that an equidistant spacing between the fiber optic sensors 202a-g may prove advantageous in processing and combining measurements obtained by the fiber optic sensors 202a-g.

The fiber optic sensors 202a-g of the present embodiment are each toroidal in shape and extend 360° around the tubular member 204. In some embodiments, as illustrated, the fiber optic sensors 202a-g may be wrapped about the tubular member 204 orthogonal to a longitudinal axis 209. In other embodiments, however, as discussed below, some or all of the fiber optic sensors 202a-g may be wrapped about the tubular member 204 at an angle offset from orthogonal to the longitudinal axis 209, without departing from the scope of the disclosure.

In some embodiments, the fiber optic sensors 202a-g may be wrapped about the outer surface or outer periphery of the tubular member 204. In other embodiments, however, the fiber optic sensors 202a-g may be positioned in corresponding recesses or grooves 210 defined in the outer surface of the tubular member 204, as illustrated. As will be appreciated, placing the fiber optic sensors 202a-g within the corresponding grooves 210 may protect the fiber optic sensors 202a-g from engaging the inner wall of the relief wellbore 106b (FIG. 1) during drilling operations and otherwise while axially traversing the relief wellbore 106b.

Figure 3:
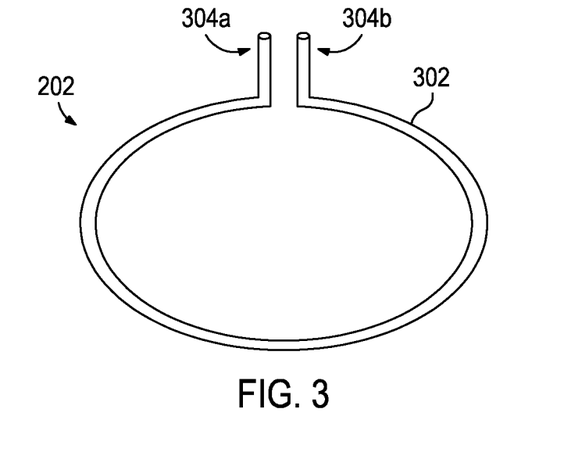
FIG. 3 is an isometric view of an exemplary fiber optic sensor.

FIG. 3 is an isometric view of an exemplary fiber optic sensor 202, according to one or more embodiments. The fiber optic sensor 202 may be the same as or similar to any of the fiber optic sensors 202a-g of FIG. 2 and, therefore, may be configured to extend 360° around the tubular member 204 (FIG. 2). As illustrated, the fiber optic sensor 202 may comprise a fiber optic cable 302 in the general shape of a toroid and having a first end 304a and a second end 304b.

Figure 4A:
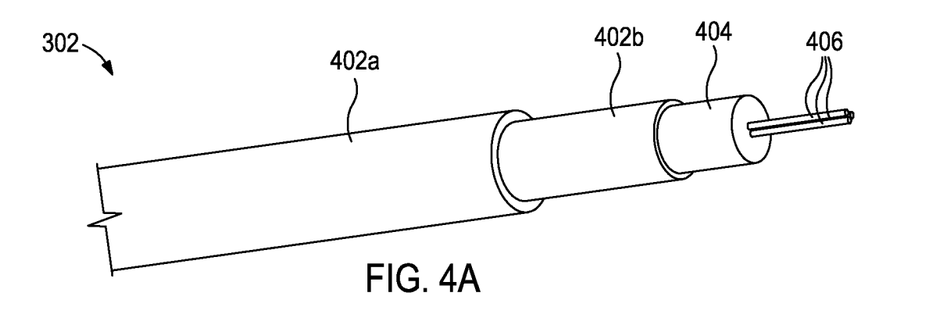
FIGS. 4A and 4B are isometric and cross-sectional end views, respectively, of an exemplary embodiment of the fiber optic cable of FIG. 3.
Figure 4B:
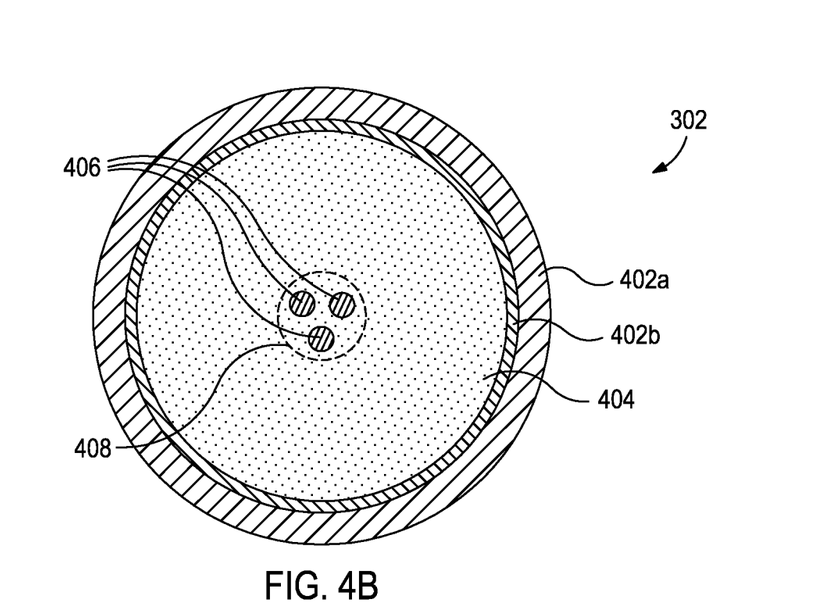

FIGS. 4A and 4B are isometric and cross-sectional end views, respectively, of an exemplary construct of the fiber optic cable 302 of FIG. 3. As illustrated, the fiber optic cable 302 includes an outer sheath 402a disposed about an inner sheath 402b, and a polymer layer 404 is disposed within the inner sheath 404. One or more optical fibers 406 (three shown) may be positioned or otherwise embedded within the polymer layer 404 and extend along all or a portion of the length of the fiber optic cable 302. The outer and inner sheaths 402a,b act as protective coatings to mitigate damage to the optical fibers 406 during operation. In some instances, however, one or both of the outer and inner sheaths 402a,b may be excluded from the fiber optic cable 302, without departing from the scope of the disclosure.

The outer and inner sheaths 402a,b may be made of a metal or a polymer with enhanced properties including anti-wearing, hermetical sealing, and high mechanical strength. In some cases, one or both of the outer and inner sheaths 402a,b may be made of a composite material, such as carbon fiber. Non-limiting examples of metals suitable for use as the outer and inner sheaths 402a,b may include stainless steel, aluminum, copper, and their alloy compositions. Non-limiting examples of polymers suitable for use as the outer and inner sheaths 402a,b may include polyolefins, polytetrafluoroethylene-perfluoromethylvinylether polymer (PTFE-MFA), perfluoro-alkoxyalkane polymer (PFA), polytetrafluoroethylene polymers (PTFE, i.e., TEFLON®), ethylene-tetrafluoroethylene polymers (ETFE), ethylene-propylene copolymers (EPC), polysulfone (PSF), polyethersulfone (PES), polyarylether ketone polymers (PAEK), polyetherether ketone (PEEK), polyphenylene sulfide polymers (PPS), modified polyphenylene sulfide polymers, polyether ketone polymers (PEK), maleic anhydride modified polymers, perfluoroalkoxy polymers, fluorinated ethylene propylene polymers, polyvinylidene fluoride polymers (PVDF), polytetrafluoroethylene-perfluoromethylvinylether polymers, polyamide polymers, polyimide polymers, polyurethane, thermoplastic polyurethane, ethylene chloro-trifluoroethylene polymers, chlorinated ethylene propylene polymers, self-reinforcing polymers based on a substituted poly(1,4-phenylene) structure where each phenylene ring has a substituent R group derived from a wide variety of organic groups, and the like, and any combination thereof.

In some embodiments, the polymer layer 404 may comprise a plastic coating or a plastic sleeve sued to envelop the optical fibers 406. In other embodiments, the polymer layer 404 may comprise a polymer matrix composite with a plurality of fibers embedded therein to provide enhanced mechanical strength. Non-limiting examples of materials suitable for use as the polymer matrix of the polymer layer 404 may include thermoplastic or thermoset resins including polyolefins, PTFE-MFA, PFA, PTFE, ETFE, EPC, poly(4-methyl-1-pentene), other fluoropolymers, PSF, PES, PAEK, PEEK, PPS, modified polyphenylene sulfide polymers, PEK, maleic anhydride modified polymers, perfluoroalkoxy polymers, fluorinated ethylene propylene polymers, PVDF, polytetrafluoroethylene-perfluoromethylvinylether polymers, polyamide polymers, polyurethane, thermoplastic polyurethane, ethylene chloro-trifluoroethylene polymers, chlorinated ethylene propylene polymers, self-reinforcing polymers based on a substituted poly(1,4-phenylene) structure where each phenylene ring has a substituent R group derived from a wide variety of organic groups, and the like, and any combination thereof.

The optical fibers 406 may be useful for obtaining acoustic (seismic and/or microseismic) and temperature measurements along the length of the optical fibers 406. In some cases, however, some or all of the optical fibers 406 may include point reflectors (e.g., Fiber Bragg gratings, etc.) included at predetermined locations along the optical fiber(s) 406 to allow the associated fiber optic sensor 202a-g (FIG. 2) to operate as a point sensor that obtains point measurements. In some embodiments, one or more of the optical fibers 406 may also be used to facilitate communicating between the BHA 114 (FIG. 1) and a surface location.

The optical fibers 406 may be low-transmission loss optical fibers that are either single-mode or multi-mode and exhibit a transmission bandwidth from about 600 nm to about 2200 nm with its lowest loss bandwidth ranging from about 150 nm to about 1550 nm. In at least one embodiment, one or more of the optical fibers 406 may exhibit a gradient refractive index (i.e., graded index) across its fiber core to ensure light transmission is strongly guided by the fiber core path that may ensure bending insensitivity and low transmission loss.

In some instances, the optical fibers 406 may be loosely housed within a hollow or "loose" tube 408 (FIG. 4B) positioned at or near the centerline of the fiber optic cable 302 and otherwise embedded within the polymer layer 404. The tube 408 provides an elongated housing for the optical fibers 406 but also isolates the optical fibers 406 from tensile stresses or strains that may be assumed by the polymer layer 404 during downhole deployment and operation. As a result, the optical fibers 406 are able to avoid signal attenuation and data infidelity during tension loading of the fiber optic cable 302 that might otherwise damage or sever the optical fibers 406. As will be appreciated, the tube 408 may also prove advantageous in providing strain-free protection to an optical fiber 406 for high fidelity data transmission.

In some embodiments, one or more of the optical fibers 406 of the fiber optic cable 302 may comprise a multi-mode optical fiber used for acoustic sensing of the fluid 126 (FIG. 1) flowing into the target wellbore 106a (FIG. 1). One or more other optical fibers 406 of the fiber optic cable 302 may comprise a multi-mode optical fiber used for temperature sensing of the fluid 126 flowing into the target wellbore 106a. In at least one embodiment, one or more additional optical fibers 406 of the fiber optic cable 302 may comprise a single-mode optical fiber used for telemetry purposes in communicating signals between the BHA 114 (FIG. 1) and a surface location, for example.

Referring again to FIG. 2, with continued reference to FIGS. 3 and 4A-4B, in some embodiments, an epoxy 212 or other suitable sealing material may seal and otherwise secure the fiber optic sensors 202a-g within the grooves 210. In at least one embodiment, as illustrated, a shroud 214 (shown in dashed lines) may be coupled to the outer surface of the tubular member 204 and extend axially across the grooves 210. The shroud 214 may be used to protect the fiber optic sensors 202a-g and the epoxy 212 during drilling operations, and may define a plurality of holes to allow transmission of acoustic and thermal energy emitted from the fluid 126 (FIG. 1) to be received by the fiber optic sensors 202a-g. In other embodiments, however, one or both of the epoxy 212 and the shroud 214 may be omitted from the assembly 124, without departing from the scope of the disclosure.

In the illustrated embodiment, each fiber optic sensor 202a-g includes a node 216 and a common fiber optic cable 218 that extends between each node 216 and communicably connects each fiber optic sensor 202a-g. The common fiber optic cable 218 may have the same construct as the fiber optic cable 302 of FIGS. 3 and 4A-4B. The ends 304a,b (FIG. 3) of the fiber optic cable 302 associated with each fiber optic sensor 202a-g may be secured at its corresponding node 216 and may be communicably coupled to the common fiber optic cable 218. Accordingly, the common fiber optic cable 218 may serve as a bus that places each fiber optic sensor 202a-g in communication with the common fiber optic cable 218.

The assembly 124 may further include a computer system 220 communicably coupled to the common fiber optic cable 218 and used to control and operate the assembly 124 and process the measurements obtained by the fiber optic sensors 202a-g. In some embodiments, the computer system 220 may be located at a surface location, such as at the second rig 102b (FIG. 1) or a remote location in communication with the second rig 102b. In such embodiments, the common fiber optic cable 218 may extend along the entire length of the drill string 116 (FIG. 1). In other embodiments, however, the computer system 220 may be located downhole, such as forming part of the BHA 114 (FIG. 1). In such embodiments, the computer system 220 may be communicably coupled to a power source 222 and a telemetry module 224.

The power source 222 may be used to provide electrical power to the components of the computer system 220 for operating the assembly 124. The power source 222 may comprise any source of electrical power including, but not limited to, a downhole generator, a battery pack, a fuel cell, or any combination thereof. The telemetry module 224 may form part of the BHA 114 (FIG. 1) and may be configured to transfer data obtained from the computer system 220 and the BHA 114 to a surface receiver (i.e., at the second rig 102b of FIG. 1) and/or to receive commands from the surface. The telemetry module 224 may comprise any known wired or wireless means of downhole communication including, but not limited to, a mud pulse telemetry system, an electromagnetic telemetry system, an acoustic telemetry system, a wired communications system (e.g., single or multiple conductors, fiber optics, etc.), a wireless communications system (e.g., radio frequency, etc.), or any combination thereof.

As illustrated, the computer system 220 may include an electromagnetic radiation source 226 and a data acquisition system 228 communicably coupled to the fiber optic sensors 202a-g via the common fiber optic cable 218. The electromagnetic radiation source 226 may be configured to emit electromagnetic radiation (light) into the optical fiber(s) 406 (FIGS. 4A-4B) of each fiber optic sensor 202a-g via the common fiber optic cable 218. The electromagnetic radiation source 226 may include, but is not limited to, ambient light, a light bulb, a light emitting diode (LED), a laser, a blackbody radiator source, a supercontinuum source, combinations thereof, or the like. Accordingly, the electromagnetic radiation may include terahertz, infrared and near-infrared radiation, visible light, and ultraviolet light.

The data acquisition system 228 may include one or more detectors 230 arranged to sense and otherwise monitor the intensity of the returning backscattered electromagnetic radiation for analysis. The detector 230 may be an optical transducer and may comprise, but is not limited to, a thermal detector (e.g., a thermopile or photoacoustic detector), a semiconductor detector, a piezo-electric detector, a charge coupled device (CCD) detector, a photodetector, a video or array detector, a split detector, a photon counter detector (such as a photomultiplier tube), any combination thereof, or any other detectors known to those skilled in the art. The data acquisition system 228 may further include a signal processor or signal analysis equipment associated with the detector 230, which may include a standard optical spectral analyzer having a processor for processing, storing in memory, and displaying to a user the detected results. The signal analysis equipment is capable of converting the received signals into an electronic signal, such as a high-speed linear photodetector array, a CCD array, or a CMOS array.

With reference to FIGS. 1 and 2, exemplary operation of drilling the relief wellbore 106b to locate and intercept the target wellbore 106a is now provided. The mobilization (influx) of the fluid 126 into the target wellbore 106a will, in most cases, provide sufficient acoustic (noise) or thermal amplitude and frequency in the surrounding formation 108 to create a chartable profile using the assembly 124. Mapping the acoustic or thermal energy will provide an accurate means to range to the target wellbore 106a via the relief wellbore 106b.

The relief wellbore 106b may be drilled under the control of the BHA 114 using conventional directional drilling equipment and techniques. Based on existing well plan data for the target wellbore 106a and real-time positional measurements obtained by the MWD tool 122, the BHA 114 may direct the trajectory of the drill bit 118 in the general direction of the target wellbore 106a. While drilling the relief wellbore 106b, the assembly 124 may be periodically activated to obtain measurements of the fluid 126 as it flows into the target wellbore 106a. In some embodiments, for example, a first ranging measurement or "check shot" may be obtained at an arbitrary point with the assembly 124. The "arbitrary point" will likely vary on the type of well being drilled, but will generally be within 300 meters of the closest approach of the anticipated intercept point as based on existing well plan data for the target wellbore 106a. Using one or more software algorithms included in the computer system 220, the backscattered light resulting from the first ranging measurement may be detected by the detector 230 and translated into acoustic or thermal data, which can then be plotted or mapped. From the first ranging measurement, a preliminary location for the target intercept location 128 may be determined.

Following the receipt and recording of the first ranging measurement, and after drilling another portion of the relief wellbore 106b toward the target intercept location 128, a second ranging measurement (check shot) may be obtained with the assembly 124. Again, the backscattered light resulting from the second ranging measurement can be translated into acoustic or thermal data with the computer system 220, which can then be plotted or mapped. The first and second ranging measurements may then be compared with the computer system 220 and, if desired, the trajectory of the drill bit 118 may be altered in a direction closer to the target intercept location 128 where the fluid 126 is flowing into the target wellbore 106a. In other words, comparing the first and second ranging measurements may result in the determination of a refined or more accurate target intercept location 128, which is closer to the true target intercept location 128.

This process of drilling, measuring, and comparing ranging measurements may be repeated as many times as needed to ultimately intercept the target wellbore 106a. As the BHA 114 advances closer to the target intercept location 128, the intensity of the acoustic or thermal energy emitted by the fluid 126 as measured by the fiber optic sensors 202a-g will increase, thereby providing a positive indication of the target intercept location 128. Appropriate trajectory corrections may be undertaken as the intensity of the acoustic or thermal energy increases, thereby indicating that the current trajectory is moving towards the target intercept location 128.

As the relief wellbore 106b is extended, the multiple ranging measurements obtained by the assembly 124 may be compared against each other and triangulated to eventually zero-in on the target intercept location 128. Based on mapping the acoustic or thermal profile of the fluid 126, a series of subsequently deeper ranging measurements may be taken to reduce the ellipse of error. As the ellipses of uncertainty close to below a value of 1, the ranging measurements will continue to zero-in on the location of the target wellbore 106a with increasing accuracy until close proximity or interception between the relief wellbore 106b and the target wellbore 106a is established.

The configuration and design of the assembly 124 may help determine the general direction of the target intercept location 128. More particularly, the toroid arrangement of the fiber optic sensors 202a-g may be configured such that a phase shift or amplitude created between adjacent fiber optic sensors 202a-g may indicate an intensity of the acoustic or thermal signal, thereby allowing a more accurate identification of the depth of influx of the fluid 126 in the target wellbore 106a. In some embodiments, for instance, the first fiber optic sensor 202a may comprise a base sensor, and phase or amplitude shifts may be calculated and recorded between signals obtained at the base sensor 202a and the remaining fiber optic sensors 202b-g.

In some embodiments, the computer system 220 may be configured to record and log measurements of the fluid 126 obtained by the fiber optic sensors 202a-g along only a portion of the toroidal structure of each fiber optic sensor 202a-g. In such embodiments, for example, the portion of the fiber optic sensors 202a-g where the measurements may be recorded may be aligned with and otherwise oriented to the high side of the relief wellbore 106b based on measurements obtained by the MWD 122. As will be appreciated, this may prove advantageous in obtaining an accurate azimuth of the influx of the fluid 126 based on the largest amplitude detected by the fiber optic sensors 202a-g.

In some embodiments, the assembly 124 may be located below (downhole from) the downhole motor 120. In such embodiments, the fiber optic sensors 202a-g may be configured to rotate along with the drill bit 118 as the relief wellbore 106b is drilled. Moreover, in such embodiments, the measurements obtained by the fiber optic sensors 202a-g may be binned azimuthally as the assembly 124 rotates. Based on the speed of rotation and timing, for example, measurements obtained by the fiber optic sensors 202a-g may be taken at predetermined angular locations, such as at every 10° or 15° of rotation. The accumulated binned results may be processed in the computer system 220 and, based on the angular location of the binned results, it may be determined at which direction the acoustic or thermal signals from the fluid 126 are originating. With this information, the trajectory of the drill bit 118 toward the target intercept location 128 may be altered.

Figure 5:
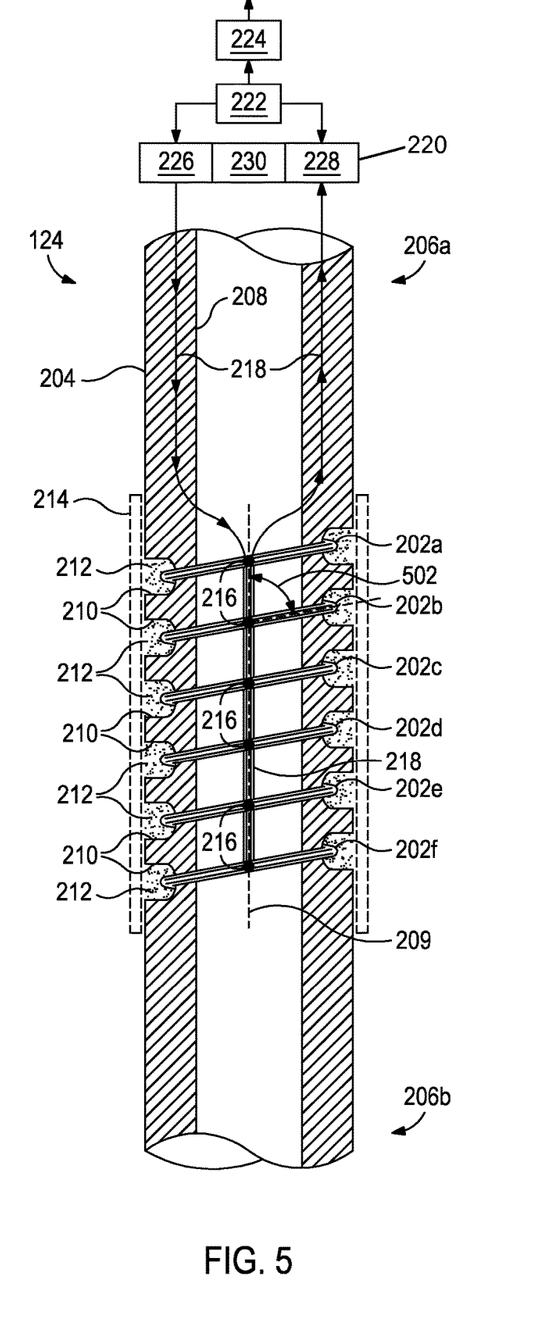
FIG. 5 is a partial cross-sectional side view of another exemplary embodiment of the fiber optic ranging assembly of FIG. 1.

FIG. 5 is a partial cross-sectional side view of another exemplary embodiment of the fiber optic ranging assembly 124 of FIG. 1, according to one or more additional embodiments. Similar reference numerals used in FIG. 2 that are used in FIG. 5 correspond to like components or elements that may not be described again. In the illustrated embodiment, a plurality of fiber optic sensors 202 are disposed about the tubular member 204 within corresponding grooves 210 and shown as fiber optic sensors 202a, 202b, 202c, 202d, 202e, and 202f. The fiber optic sensors 202a-f of the present embodiment are each again toroidal in shape and extend 360° around the tubular member 204. Moreover, the common fiber optic cable 218 extends between each node 216 and communicably connects each fiber optic sensor 202*a-f* to the computer system 220, the power source 222, and the telemetry module 224.

Unlike the embodiment of FIG. 2, however, the fiber optic sensors 202*a-f* are depicted as being wrapped about the tubular member 204 at an angle 502 offset from the longitudinal axis 209. The angle 502 can range anywhere from 1° to 89°, without departing from the scope of the disclosure. As will be appreciated, having the fiber optic sensors 202*a-f* are angularly offset from the longitudinal axis 209 may allow for the incorporation of additional fiber optic sensors in the same linear distance. As a result, the fiber optic ranging assembly 124 may exhibit a greater density of fiber optic sensors 202, which may increase data input and lead to greater accuracy.

Operation of the assembly 124 of FIG. 5 is substantially similar to operation of the embodiment shown in FIG. 2 and, therefore, will not be described again.

Figure 6:
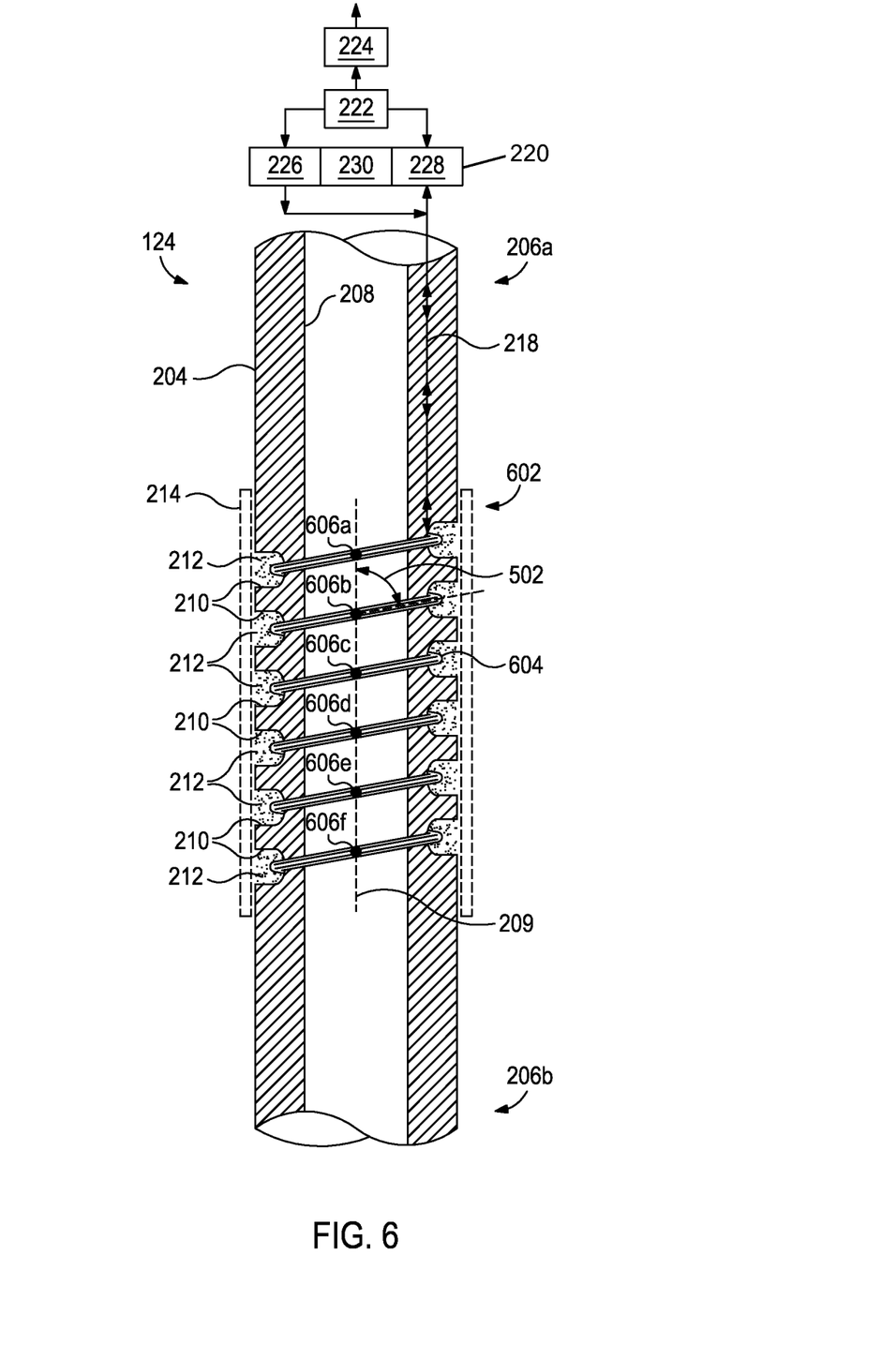
FIG. 6 is a partial cross-sectional side view of another exemplary embodiment of the fiber optic ranging assembly of FIG. 1.

FIG. 6 is a partial cross-sectional side view of another exemplary embodiment of the fiber optic ranging assembly 124 of FIG. 1, according to one or more additional embodiments. Again, similar reference numerals used in FIG. 2 that are used in FIG. 5 correspond to like component or elements that may not be described again. In the illustrated embodiment, the assembly 124 includes a fiber optic sensor 602 that comprises a fiber optic cable 604 helically wrapped about the tubular member 204. In some embodiments, the fiber optic cable 604 may be wrapped about the outer surface or outer periphery of the tubular member 204. In other embodiments, however, the fiber optic cable 604 may be positioned in the corresponding grooves 210, as illustrated. Moreover, the fiber optic cable 604 may be wrapped about the tubular member 204 at the angle 502.

The fiber optic cable 604 may be similar to the fiber optic cable 302 of FIG. 3 and may include a plurality of point sensors 606, shown as point sensors 606*a*, 606*b*, 606*c*, 606*d*, 606*e*, and 606*f*. The point sensors 606*a-f* may comprise point reflectors (e.g., Fiber Bragg gratings, etc.) arranged at predetermined locations along the fiber optic cable 604 to obtain point measurements. The common fiber optic cable 218 may be communicably coupled to the fiber optic cable 604 (or form an integral extension thereof) and communicably connect the fiber optic cable 604 to the computer system 220, the power source 222, and the telemetry module 224.

Operation of the assembly 124 of FIG. 5 is substantially similar to operation of the embodiment shown in FIG. 2. More particularly, the point sensors 606*a-f* may operate in a similar fashion to the fiber optic sensors 202*a-g* in obtaining ranging measurements that may be compared against each other with the computer system 220. As the relief wellbore 106*b* (FIG. 1) is extended, the multiple ranging measurements obtained by the assembly 124 may be compared against each other and triangulated to eventually zero-in on the target intercept location 128 (FIG. 1).

Computer hardware used to implement the various illustrative methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments disclosed herein include:

A. A well system that includes a target wellbore that penetrates a subterranean formation, a relief wellbore drilled toward the target wellbore and a target intercept location where a fluid flows into the target wellbore from the subterranean formation, a bottom hole assembly coupled to a drill string extended into the relief wellbore and including a fiber optic ranging assembly having one or more fiber optic sensors positioned on a tubular member, wherein the one or more fiber optic sensors measure at least one of acoustic energy and thermal energy emitted by the fluid as it flows into the target wellbore, and a computer system communicably coupled to the one or more fiber optic sensors to process measurements of the fluid obtained by the one or more fiber optic sensors.

B. A method that includes introducing a bottom hole assembly coupled to a drill string into a relief wellbore, the bottom hole assembly including a drill bit and a fiber optic ranging assembly having one or more fiber optic sensors, drilling a first portion of the relief wellbore with the drill bit toward a target wellbore that penetrates a subterranean formation, obtaining a first ranging measurement of a fluid flowing into the target wellbore from the subterranean formation with the one or more fiber optic sensors and thereby determining a target intercept location, drilling a second portion of the relief wellbore toward the target intercept location, obtaining a second ranging measurement of the fluid flowing into the target wellbore with the one or more fiber optic sensors after drilling the second portion, and comparing the first and second ranging measurements to update the target intercept location, wherein the first and second ranging measurements are indicative of at least one of acoustic energy and thermal energy emitted by the fluid as it flows into the target wellbore.

C. A bottom hole assembly that includes a fiber optic ranging assembly having one or more fiber optic sensors positioned on a tubular member connectable to a drill string extendable within a first wellbore, wherein the one or more fiber optic sensors measure at least one of acoustic energy and thermal energy emitted by fluid flowing into a second wellbore, and a computer system communicably coupled to the one or more fiber optic sensors to process measurements of the fluid obtained by the one or more fiber optic sensors.

Each of embodiments A, B, and C may have one or more of the following additional elements in any combination: Element 1: wherein the one or more fiber optic sensors comprises a plurality of toroidal fiber optic sensors axially spaced from each other along a length of the tubular member, and a common optical fiber that communicably couples each toroidal fiber optic sensor to the computer system. Element 2: wherein the computer system comprises an electromagnetic radiation source that emits electromagnetic radiation into the one or more fiber optic sensors, and a data acquisition system that includes a detector arranged to receive backscattered electromagnetic radiation received from the one or more fiber optic sensors. Element 3: wherein the bottom hole assembly further comprises a power source that provides electrical power to the computer system to operate the fiber optic sensing assembly, and a telemetry module communicably coupled to the computer system to transfer data obtained from the computer system to a surface location. Element 4: wherein the one or more fiber optic sensors comprises a fiber optic cable helically wrapped about the tubular member at an angle offset from a longitudinal axis of the tubular member.

Element 5: further comprising processing the first and second ranging measurements with a computer system communicably coupled to the one or more fiber optic sensors. Element 6: wherein the computer system includes an electromagnetic radiation source and a data acquisition system that includes a detector, the method further comprising emitting electromagnetic radiation into the one or more fiber optic sensors with the electromagnetic radiation source, and receiving backscattered electromagnetic radiation with the detector from the one or more fiber optic sensors. Element 7: wherein processing the first and second ranging measurements comprises translating backscattered electromagnetic radiation received from the one or more fiber optic sensors into acoustic or thermal data with the computer system, and plotting or mapping the acoustic or thermal data. Element 8: wherein the one or more fiber optic sensors comprises a plurality of toroidal fiber optic sensors axially spaced from each other along a length of a tubular member, the method further comprising obtaining the first and second ranging measurements along only a portion of each toroidal fiber optic sensor, and aligning the portion of each toroidal fiber optic sensor with a high side of the relief wellbore. Element 9: wherein the one or more fiber optic sensors comprises a plurality of toroidal fiber optic sensors axially spaced from each other along a length of a tubular member, and wherein obtaining the first and second ranging measurements comprises determining a phase shift or an amplitude shift between adjacent toroidal fiber optic sensors. Element 10: wherein the bottom hole assembly further includes a downhole motor that rotates the drill bit and the fiber optic ranging assembly is arranged downhole from the downhole motor, the method further comprising rotating the fiber optic ranging assembly as the downhole motor rotates the drill bit, and binning the first and second ranging measurements at predetermined angular locations. Element 11: wherein the one or more fiber optic sensors comprises a fiber optic cable helically wrapped about the tubular member at an angle offset from a longitudinal axis of the tubular member, the method further comprising obtaining point measurements of the fluid with a plurality of point sensors included in the fiber optic cable and arranged at predetermined locations along the fiber optic cable.

Element 12: wherein the one or more fiber optic sensors comprises a plurality of toroidal fiber optic sensors axially spaced from each other along a length of the tubular member, and a common optical fiber that communicably couples each toroidal fiber optic sensor to the computer system. Element 13: wherein some or all of the toroidal fiber optic sensors are equidistantly spaced from each other. Element 14: wherein the one or more toroidal fiber optic sensors are arranged about the tubular member at an angle offset from a longitudinal axis of the tubular member. Element 15: wherein the one or more fiber optic sensors are positioned in one or more corresponding grooves defined in an outer surface of the tubular member. Element 16: further comprising a shroud coupled to an outer surface of the tubular member and extending axially across the one or more corresponding grooves. Element 17: further comprising an epoxy disposed in the one or more corresponding grooves to seal the one or more fiber optic sensors within the one or more corresponding grooves. Element 18: wherein the one or more fiber optic sensors comprises a fiber optic cable helically wrapped about the tubular member at an angle offset from a longitudinal axis of the tubular member. Element 19: further comprising a plurality of point sensors included in the fiber optic cable and arranged at predetermined locations along the fiber optic cable to obtain point measurements of the fluid.

By way of non-limiting example, exemplary combinations applicable to A, B, and C include: Element 5 with Element 6; Element 5 with Element 7; Element 12 with Element 13; Element 12 with Element 14; Element 15 with Element 16; Element 15 with Element 17; and Element 18 with Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A well system, comprising:
   a target wellbore that penetrates a subterranean formation;
   a relief wellbore drilled toward the target wellbore and a target intercept location where a fluid flows into the target wellbore from the subterranean formation;
   a bottom hole assembly coupled to a drill string extended into the relief wellbore and including a fiber optic ranging assembly having one or more fiber optic sensors positioned on a tubular member,
   wherein the one or more fiber optic sensors measure at least one of acoustic energy and thermal energy emitted by the fluid as it flows into the target wellbore,
   wherein the one or more fiber optic sensors comprises a plurality of toroidal fiber optic sensors axially spaced from each other along a length of a tubular member, and
   wherein a portion of each toroidal fiber optic sensor is aligned with a high side of the relief wellbore such that measurements of the fluid are obtained along a portion of each toroidal fiber optic sensors; and
   a computer system communicably coupled to the one or more fiber optic sensors to process the measurements of the fluid obtained by the one or more fiber optic sensors.

2. The well system of claim 1, wherein the one or more fiber optic sensors comprises:
   a plurality of toroidal fiber optic sensors axially spaced from each other along a length of the tubular member; and
   a common optical fiber that communicably couples each toroidal fiber optic sensor to the computer system.

3. The well system of claim 1, wherein the computer system comprises:
   an electromagnetic radiation source that emits electromagnetic radiation into the one or more fiber optic sensors; and
   a data acquisition system that includes a detector arranged to receive backscattered electromagnetic radiation received from the one or more fiber optic sensors.

4. The well system of claim 1, wherein the bottom hole assembly further comprises:
   a power source that provides electrical power to the computer system to operate the fiber optic sensing assembly; and
   a telemetry module communicably coupled to the computer system to transfer data obtained from the computer system to a surface location.

5. The well system of claim 1, wherein the one or more fiber optic sensors comprises a fiber optic cable helically wrapped about the tubular member at an angle offset from a longitudinal axis of the tubular member.

6. A method, comprising:
   introducing a bottom hole assembly coupled to a drill string into a relief wellbore, the bottom hole assembly including a drill bit and a fiber optic ranging assembly having one or more fiber optic sensors that have a plurality of toroidal fiber optic sensors axially spaced from each other along a length of a tubular member;
   drilling a first portion of the relief wellbore with the drill bit toward a target wellbore that penetrates a subterranean formation;
   obtaining a first ranging measurement of a fluid flowing into the target wellbore from the subterranean formation with the one or more fiber optic sensors and thereby determining a target intercept location;
   drilling a second portion of the relief wellbore toward the target intercept location;
   obtaining a second ranging measurement of the fluid flowing into the target wellbore with the one or more fiber optic sensors after drilling the second portion;
   comparing the first and second ranging measurements to update the target intercept location, wherein the first and second ranging measurements are indicative of at least one of acoustic energy and thermal energy emitted by the fluid as it flows into the target wellbore;
   obtaining the first and second ranging measurements along only a portion of each toroidal fiber optic sensor; and
   aligning the portion of each toroidal fiber optic sensor with a high side of the relief wellbore.

7. The method of claim 6, further comprising processing the first and second ranging measurements with a computer system communicably coupled to the one or more fiber optic sensors.

8. The method of claim 7, wherein the computer system includes an electromagnetic radiation source and a data acquisition system that includes a detector, the method further comprising:
   emitting electromagnetic radiation into the one or more fiber optic sensors with the electromagnetic radiation source; and
   receiving backscattered electromagnetic radiation with the detector from the one or more fiber optic sensors.

9. The method of claim 7, wherein processing the first and second ranging measurements comprises:
   translating backscattered electromagnetic radiation received from the one or more fiber optic sensors into acoustic or thermal data with the computer system; and
   plotting or mapping the acoustic or thermal data.

10. The method of claim 6, wherein the one or more fiber optic sensors comprises a plurality of toroidal fiber optic sensors axially spaced from each other along a length of a tubular member, and wherein obtaining the first and second ranging measurements comprises:
   determining a phase shift or an amplitude shift between adjacent toroidal fiber optic sensors.

11. The method of claim 6, wherein the bottom hole assembly further includes a downhole motor that rotates the drill bit and the fiber optic ranging assembly is arranged downhole from the downhole motor, the method further comprising:
   rotating the fiber optic ranging assembly as the downhole motor rotates the drill bit; and
   binning the first and second ranging measurements at predetermined angular locations.

12. The method of claim 6, wherein the one or more fiber optic sensors comprises a fiber optic cable helically wrapped about the tubular member at an angle offset from a longitudinal axis of the tubular member, the method further comprising:
   obtaining point measurements of the fluid with a plurality of point sensors included in the fiber optic cable and arranged at predetermined locations along the fiber optic cable.

13. A bottom hole assembly, comprising:
   a fiber optic ranging assembly having one or more fiber optic sensors positioned on a tubular member connectable to a drill string extendable within a first wellbore, wherein the one or more fiber optic sensors measure at least one of acoustic energy and thermal energy emitted by a fluid flowing into a second wellbore,
   wherein the one or more fiber optic sensors comprises a plurality of toroidal fiber optic sensors axially spaced from each other along a length of the tubular member;
   wherein a portion of each toroidal fiber optic sensor is aligned with a high side of the first wellbore; and
   a computer system communicably coupled to the one or more fiber optic sensors to process measurements of the fluid obtained by the one or more fiber optic sensors,
   wherein the measurements of the fluid are obtained along a portion of each toroidal fiber optic sensor.

14. The bottom hole assembly of claim 13, wherein the one or more fiber optic sensors are axially spaced from each other along a length of the tubular member and comprises:
   a common optical fiber that communicably couples each toroidal fiber optic sensor to the computer system.

15. The bottom hole assembly of claim 14, wherein some or all of the toroidal fiber optic sensors are equidistantly spaced from each other.

16. The bottom hole assembly of claim 14, wherein the one or more toroidal fiber optic sensors are arranged about the tubular member at an angle offset from a longitudinal axis of the tubular member.

17. The bottom hole assembly of claim 13, wherein the one or more fiber optic sensors are positioned in one or more corresponding grooves defined in an outer surface of the tubular member.

18. The bottom hole assembly of claim 17, further comprising a shroud coupled to an outer surface of the tubular member and extending axially across the one or more corresponding grooves.

19. The bottom hole assembly of claim 17, further comprising an epoxy disposed in the one or more corresponding grooves to seal the one or more fiber optic sensors within the one or more corresponding grooves.

20. The bottom hole assembly of claim 13, wherein the one or more fiber optic sensors comprises a fiber optic cable helically wrapped about the tubular member at an angle offset from a longitudinal axis of the tubular member.

21. The well system of claim 20, further comprising a plurality of point sensors included in the fiber optic cable and arranged at predetermined locations along the fiber optic cable to obtain point measurements of the fluid.

22. A method, comprising:
   introducing a bottom hole assembly coupled to a drill string into a relief wellbore, the bottom hole assembly including a drill bit and a fiber optic ranging assembly having one or more fiber optic sensors;
   drilling a first portion of the relief wellbore with the drill bit toward a target wellbore that penetrates a subterranean formation;
   obtaining a first ranging measurement of a fluid flowing into the target wellbore from the subterranean formation with the one or more fiber optic sensors and thereby determining a target intercept location;
   drilling a second portion of the relief wellbore toward the target intercept location;
   obtaining a second ranging measurement of the fluid flowing into the target wellbore with the one or more fiber optic sensors after drilling the second portion;
   comparing the first and second ranging measurements to update the target intercept location, wherein the first and second ranging measurements are indicative of at least one of acoustic energy and thermal energy emitted by the fluid as it flows into the target wellbore;
   wherein the bottom hole assembly further includes a downhole motor that rotates the drill bit and the fiber optic ranging assembly is arranged downhole from the downhole motor;
   rotating the fiber optic ranging assembly as the downhole motor rotates the drill bit; and
   binning the first and second ranging measurements at predetermined angular locations.

23. The method of claim 22, further comprising processing the first and second ranging measurements with a computer system communicably coupled to the one or more fiber optic sensors.

24. The method of claim 23, wherein the computer system includes an electromagnetic radiation source and a data acquisition system that includes a detector, the method further comprising:
   emitting electromagnetic radiation into the one or more fiber optic sensors with the electromagnetic radiation source; and
   receiving backscattered electromagnetic radiation with the detector from the one or more fiber optic sensors.

25. The method of claim 23, wherein processing the first and second ranging measurements comprises:
   translating backscattered electromagnetic radiation received from the one or more fiber optic sensors into acoustic or thermal data with the computer system; and
   plotting or mapping the acoustic or thermal data.

26. The method of claim 22, wherein the one or more fiber optic sensors comprises a plurality of toroidal fiber optic sensors axially spaced from each other along a length of a tubular member, the method further comprising:
   obtaining the first and second ranging measurements along only a portion of each toroidal fiber optic sensor; and
   aligning the portion of each toroidal fiber optic sensor with a high side of the relief wellbore.

27. The method of claim 22, wherein the one or more fiber optic sensors comprises a plurality of toroidal fiber optic sensors axially spaced from each other along a length of a tubular member, and wherein obtaining the first and second ranging measurements comprises:
determining a phase shift or an amplitude shift between adjacent toroidal fiber optic sensors.

28. A well system, comprising:
a target wellbore that penetrates a subterranean formation;
a relief wellbore drilled toward the target wellbore and a target intercept location where a fluid flows into the target wellbore from the subterranean formation;
a bottom hole assembly coupled to a drill string extended into the relief wellbore and including a fiber optic ranging assembly having one or more fiber optic sensors positioned on a tubular member,
wherein the bottom hole assembly further includes a downhole motor that rotates the drill bit and the fiber optic ranging assembly is arranged downhole from the downhole motor such that the fiber optic ranging assembly is rotated as the downhole motor rotates the drill bit,
wherein the one or more fiber optic sensors measure at least one of acoustic energy and thermal energy emitted by the fluid as it flows into the target wellbore; and
a computer system communicably coupled to the one or more fiber optic sensors to process measurements of the fluid obtained by the one or more fiber optic sensors, wherein the measurements of the fluid are binned at predetermined angular locations.

29. The well system of claim 28, wherein the one or more fiber optic sensors comprises:
a plurality of toroidal fiber optic sensors axially spaced from each other along a length of the tubular member; and
a common optical fiber that communicably couples each toroidal fiber optic sensor to the computer system.

30. The well system of claim 28, wherein the computer system comprises:
an electromagnetic radiation source that emits electromagnetic radiation into the one or more fiber optic sensors; and
a data acquisition system that includes a detector arranged to receive backscattered electromagnetic radiation received from the one or more fiber optic sensors.

31. The well system of claim 28, wherein the bottom hole assembly further comprises:
a power source that provides electrical power to the computer system to operate the fiber optic sensing assembly; and
a telemetry module communicably coupled to the computer system to transfer data obtained from the computer system to a surface location.

32. A bottom hole assembly, comprising:
a fiber optic ranging assembly having one or more fiber optic sensors positioned on a tubular member connectable to a drill string extendable within a first wellbore, wherein the one or more fiber optic sensors measure at least one of acoustic energy and thermal energy emitted by a fluid flowing into a second wellbore; and
a downhole motor that rotates the drill bit and the fiber optic sensors are arranged downhole from the downhole motor, wherein the fiber optic sensors are rotated as the downhole motor rotates the drill bit;
a computer system communicably coupled to the one or more fiber optic sensors to process measurements of the fluid obtained by the one or more fiber optic sensors, wherein the measurements of the fluid are binned at predetermined angular locations.

33. The bottom hole assembly of claim 32, wherein the one or more fiber optic sensors comprises:
a plurality of toroidal fiber optic sensors axially spaced from each other along a length of the tubular member; and
a common optical fiber that communicably couples each toroidal fiber optic sensor to the computer system.

34. The bottom hole assembly of claim 33, wherein some or all of the toroidal fiber optic sensors are equidistantly spaced from each other.

35. The bottom hole assembly of claim 33, wherein the one or more toroidal fiber optic sensors are arranged about the tubular member at an angle offset from a longitudinal axis of the tubular member.

36. The bottom hole assembly of claim 32, wherein the one or more fiber optic sensors are positioned in one or more corresponding grooves defined in an outer surface of the tubular member.

37. The bottom hole assembly of claim 36, further comprising a shroud coupled to an outer surface of the tubular member and extending axially across the one or more corresponding grooves.

38. The bottom hole assembly of claim 36, further comprising an epoxy disposed in the one or more corresponding grooves to seal the one or more fiber optic sensors within the one or more corresponding grooves.

* * * * *